United States Patent
Singh et al.

(10) Patent No.: US 8,572,541 B2
(45) Date of Patent: Oct. 29, 2013

(54) METHOD AND SYSTEM FOR ADAPTIVE PHYSICAL DESIGN

(75) Inventors: Nitin Kumar Singh, Dallas, TX (US); Rajarshee P. Bharadwaj, Dallas, TX (US); Rolf Lagerquist, Richardson, TX (US); Alice Wang, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 186 days.

(21) Appl. No.: 12/876,138

(22) Filed: Sep. 5, 2010

(65) Prior Publication Data

US 2012/0060138 A1 Mar. 8, 2012

(51) Int. Cl.
*G06F 17/50* (2006.01)

(52) U.S. Cl.
USPC ............ 716/120; 716/118; 716/119; 716/122

(58) Field of Classification Search
USPC ........................................ 716/120
See application file for complete search history.

(56) References Cited

U.S. PATENT DOCUMENTS

| | | | |
|---|---|---|---|
| 6,792,582 B1 * | 9/2004 | Cohn et al. ............. | 716/120 |
| 2007/0290270 A1 | 12/2007 | Ko et al. | |
| 2008/0301594 A1 | 12/2008 | Jiang et al. | |
| 2009/0039952 A1 | 2/2009 | Wang et al. | |
| 2009/0267638 A1 | 10/2009 | Li et al. | |
| 2010/0070938 A1 | 3/2010 | Wang et al. | |
| 2010/0077374 A1 | 3/2010 | Qiu | |
| 2010/0174923 A1 | 7/2010 | Houlihan et al. | |

OTHER PUBLICATIONS

Accellera Standards, "Unified Power Format (UPF) Standard, Version 1.0", Feb. 22, 2007, pp. 1-104, Accellera Organization, Napa, CA.

* cited by examiner

*Primary Examiner* — Jack Chiang
*Assistant Examiner* — Eric Lee
(74) *Attorney, Agent, or Firm* — Ronald O. Neerings; W. James Brady; Frederick J. Telecky, Jr.

(57) ABSTRACT

A method is provided that includes performing a free placement of a system design comprising a plurality of power domains, wherein the power domains are not constrained to physical regions, assigning a physical region to each of the power domains based on the free placement of cells in the power domains, performing a soft cluster placement of the system design with each power domain and corresponding physical region defined as a soft cluster, refining at least one physical region based on the soft cluster placement, redefining cells in at least one power domain based on the soft cluster placement of the cells and the corresponding physical region, and performing a hard cluster placement of the system design with each power domain and corresponding physical region defined as a hard cluster to generate final power domains.

20 Claims, 15 Drawing Sheets

METHOD AND SYSTEM FOR ADAPTIVE PHYSICAL DESIGN

BACKGROUND OF THE INVENTION

As electronic devices continue to become more feature rich, the extra functionality typically requires the addition of circuitry to the electronic devices. The additional circuitry being added to the electronic devices usually takes the form of integrated circuits, be it in the form of extra integrated circuits or revisions of existing integrated circuits with more functional parts. While integrated circuits typically offer enhanced reliability and lower power consumption over discrete components, the addition of extra integrated circuits usually means that the electronic devices will incur an increase in power consumption. Increased power consumption may be undesirable, especially for wireless electronic devices, e.g., cellular telephones, personal music players, etc., where the increased power consumption may decrease the operating time between battery charges.

In an electronic device with a wide array of features, only a few of the features may be in use at any given time. For example, in a smart communications device containing a cellular telephone, a web browser, a personal digital assistant, a pager, a multimedia player, a navigation device, and so forth, the use of a single feature often precludes the use of many of the remaining features. For example, when a user is speaking on the cellular telephone, it may be that the multimedia player and/or the browser and/or the navigation device will not in active use. Therefore, power may be reduced or turned off for integrated circuitry implementing the features not in use to help reduce power consumption.

One approach commonly used to help reduce power consumption in an electronic device is partitioning of integrated circuits in the device into power domains. When a circuit in a power domain is needed, then all circuitry in the power domain is powered. If no circuitry in a power domain is needed, then none of the circuitry in the power domain is powered. Enhancements to this approach add hierarchical power domain trees to increase control over which circuits to turn on and which to turn off, while other enhancements have helped to resolve signal routing problems and power rail stability. Partitioning of circuits into power domains and the addition of power control hardware for the domains may significantly complicate the design and development process as the partitioning into power domains may adversely affect wire length, area, and timing in an electronic device.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
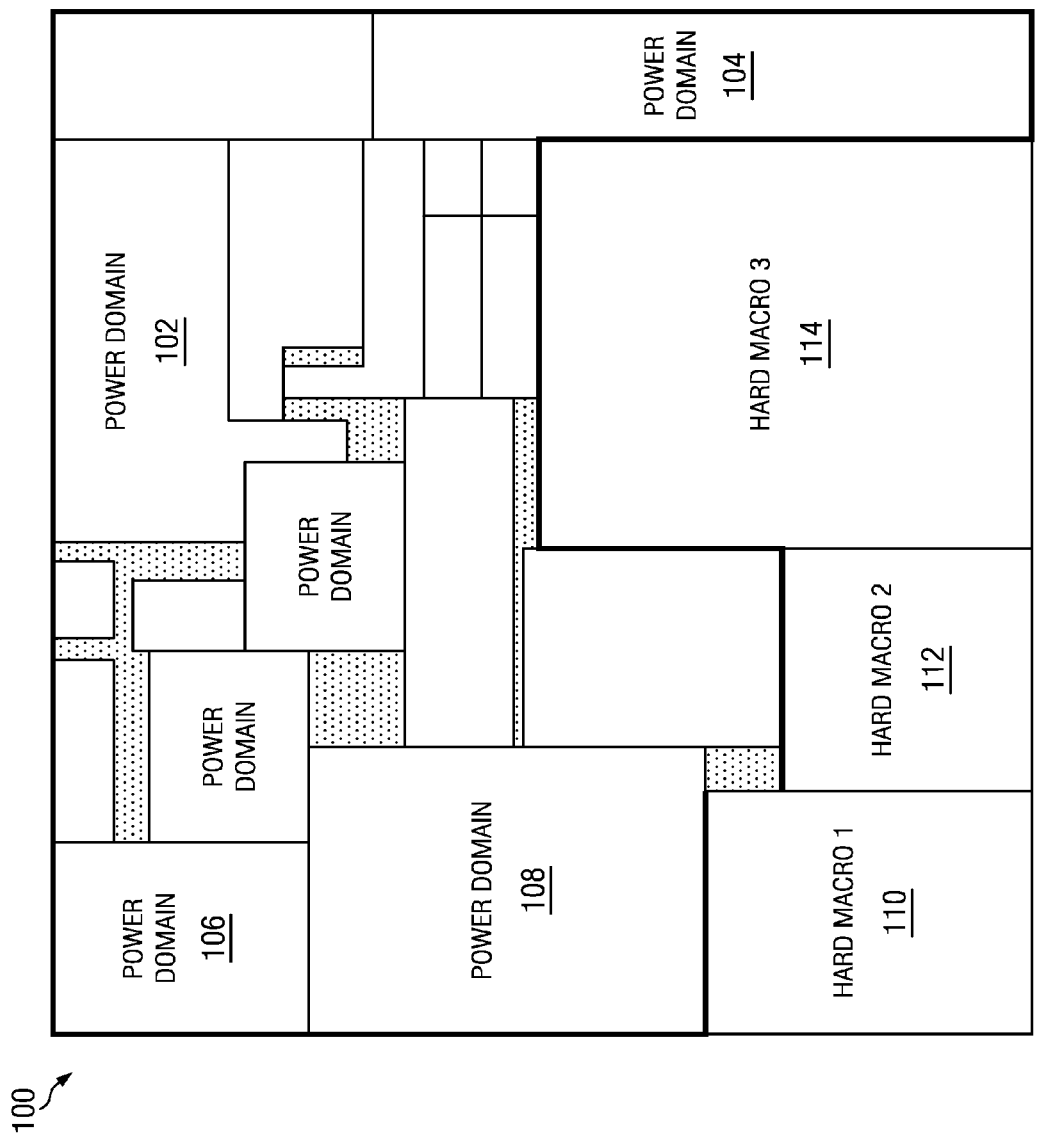
FIGS. 1 and 2 show block diagrams of systems in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the terms "couple" and "connect" and derivatives thereof are intended to mean an indirect, direct, optical, and/or wireless electrical connection. Thus, if a first device couples or connects to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

Embodiments of the invention described herein may be implemented by software stored on one or more computer readable storage media and executed on a computer. Additionally, some of the disclosed techniques may be implemented as part of a computer implemented electronic design automation (EDA) system or may interface with an EDA system. The techniques may be executed on a single computer or a computer networked with another computer or computers. For clarity, only those aspects of the tools or computer germane to the disclosed techniques are described and details well known in the art may be omitted.

For simplicity of explanation, some embodiments of the invention are described herein in a specific context, namely an integrated circuit containing multiple power domains and a single top level power domain. However, one of ordinary skill in the art will understand embodiments for integrated circuits containing multiple power domains and multiple top level power domains and to system designs including multiple integrated circuits packaged together, such as in a multi-chip module, a system on a chip, and so forth, into a single electronic device.

Embodiments of the invention provide for automated floorplan generation for a system design that includes fine-grained power domains. More specifically, embodiments of the invention provide for adaptive definition and placement of power domains in the floorplan of a system. In one or more embodiments of the invention, the cells included in a power domain and the physical region in the floorplan assigned to the power domain are adaptively refined such that as many cells in the power domain definition as is feasible may be pulled into the physical region for that power domain. Power domains are initially defined in a system design with no physical regions assigned to the domains. An initial placement, i.e., a free placement, is then performed on the system design. Based on this free placement of the cells in the power domains, physical regions in the floorplan are assigned to each of the power domains. The system design is then placed with each power domain and the corresponding physical region defined as a soft cluster. The dimensions of the physical regions may then be refined based on the results of the soft cluster placement and the cells included in the power domains may also be redefined based on the soft cluster placement and the corresponding physical regions. The system design is then placed with each of the power domains and corresponding physical regions defined as hard clusters to generate the final power domains.

FIG. 1 shows an integrated circuit (IC) (100) with power domains placed in accordance with one or more embodiments of the invention. The IC (100) includes hard macros (110, 112, 114) and a top level power domain (102). The hard macros (110, 112, 114) may be functional units that are pre-designed and added to the IC (100) to provide desired functionality. Examples of hard macros include processing elements, application specific integrated circuits, signal processors, radio circuits, filters, etc. The hard macros may be purchased from other vendors or may be designed by different development teams and then added to the IC (100) using electronic design automation (EDA) tools. The hard macros may have their own power control hardware and/or software and may require modification to the power control hardware/software to ensure interoperability.

The top level power domain (102) may include circuitry to enable interoperability between the hard macros contained in the integrated IC (100). The top level power domain (102) may also include functional blocks designed by various development teams that may be too fine grained (i.e., small) to warrant an individual power domain. Furthermore, the top level power domain (102) includes a number of lower level power domains (e.g., 104, 106, 108) placed in accordance with one or more embodiments of the invention. The individual power domains may have an arbitrary size and shape, but there may also be restrictions on their shapes. Allowing arbitrary sizes and shapes may optimize the area used by the power domains as well as performance. For example, arbitrary sizes and shapes may enable closer placement of power domains, which may reduce the overall size of the IC (100). Restricting the sizes and/or shapes of power domains to regular shapes such as, for example, shapes with square corners as shown in FIG. 1 or rectangular shapes, may simplify circuit design, signal routing, cell placement, etc. at the possible cost of an increase in the overall size of the IC (100).

Figure 2:
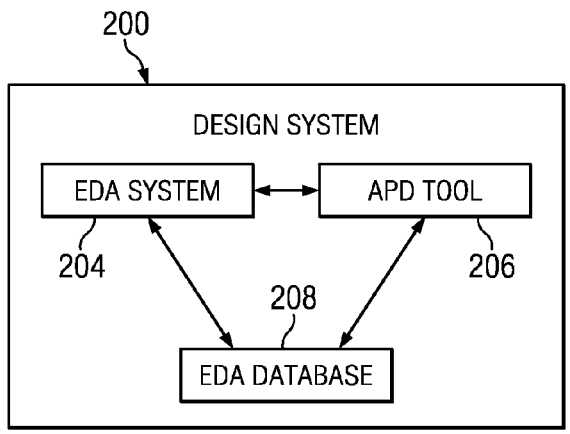

FIG. 2 shows a block diagram of a design system (200) for designing integrated circuits (e.g., IC (100) of FIG. 1) in accordance with one or more embodiments of the invention. The design system (300), which may be any suitable computer system, includes an electronic design automation (EDA) system (204), an adaptive physical design (APD) tool (206), and an EDA database (208) operably connected to the EDA system (204) and the APD toll (206). The EDA system (204) includes one or more software tools used to generate a design for an IC. These software tools include functionality for assigning cells in the design to power domains. The software tools may include a floorplanning tool for defining the floorplans of the ICs, and a placement tool for placing cells in the floorplans. The APD tool (206) interacts with the EDA system (204) during the placement portion of the IC design as described herein to manage the physical placement of power domains in the IC design in the final floorplan of the IC. The end result is the production of a design layout for fabrication of the IC. The EDA database (208), which may be stored in any suitable combination of memory and storage devices, stores the various libraries and other data used by the EDA tool (204) and the output files of the EDA system (204) and the APD tool (206).

The EDA system (204) may be any suitable collection of software tools that provides computer-aided design of ICs. Suitable EDA systems are available from, for example, Magma Design Automation, Inc. (Santa Clara, Calif.), Cadence Design Systems, Inc. (San Jose, Calif.), and Mentor Graphics (Wilsonville, Oreg.). The EDA system (204) includes functionality to receive as input a set of design criteria and specifications that describe the design of an IC. This set of criteria and specifications may be in the form of high level behavior descriptions of the IC device using a high-level hardware design language (HDL) such as Verilog or VHDL. The EDA system (204) translates the high-level design language into netlists of various levels of abstraction. A netlist describes, for example, interconnections of nodes and components on the chip and includes, for example, information of circuit primitives such as transistors and diodes, along with their sizes and interconnections. In some embodiments of the invention, the EDA system (204) provides support for a cell-based design methodology. A cell is an abstract representation of a component in a design. Cell libraries for use in designs are provided in the EDA database (208).

The APD tool (206) includes functionality to interact with the EDA system (204) as part of the physical design phase of an IC to physically place power domains in the floorplan of the IC. More specifically, the APD tool (206) includes functionality to parse a netlist generated by the EDA system (204) to identify power domain definitions. That is, the APD tool (206) can identify the power domains defined in the netlist and which cells belong to which power domain. Further, the APD tool (206) includes functionality to query the EDA database (208) to determine the locations of the cells in the placed database. The APD tool (206) also includes functionality to generate sequences of commands, which may be in the form of scripts, to cause the EDA system (204) to make changes in the physical placement of power domains and/or in the cells included in power domains.

In operation, the EDA system (204) is used to generate the design of an IC including the definition of power domains. At this point in the design process, no physical regions in the IC floorplan are specified for the power domains. The EDA system (204) is used to perform an initial placement of the design. This initial placement may be referred to as a free placement since the cells in the power domains are not restricted to particular physical regions. After the free placement, the APD tool (206) parses the resulting netlist to identify the power domains, and assigns a physical region in the IC floorplan to each power domain. As is explained in more detail below in reference to FIG. 3, the location and shape of a physical region for each power domain is selected based on the location and shape of the maximum concentration of cells in the power domain in the IC floorplan after the initial placement. The APD tool (206) then generates a sequence of commands to communicate the physical regions for each power domain to the EDA system (204) and to cause the EDA system (204) to perform another placement of the design with each of the power domains with their assigned physical regions defined as "soft" clusters.

A cluster is a set of cells and an area, i.e., region, in a floorplan where the set of cells is to be placed. A cluster definition may be binding, i.e., hard, or non-binding, i.e., soft. If the cluster definition is binding, the EDA system (204) is forced to place the set of cells in the specified region. If the cluster definition is non-binding, the EDA system (204) tries to place the set of cells in the specified region, but if placing one or more of the cells in the region adversely affects QoR (quality of results) metrics (e.g., wire length, area, timing, power consumption), the EDA system (204) is not forced to place those cells in the specified region. A binding cluster definition may also be inclusive or not inclusive. If a binding cluster definition is inclusive, then cells that are not in the cluster may also be placed in the corresponding region. If a binding cluster is not inclusive, then only the cells in the cluster may be placed in the corresponding region.

Responsive to the sequence of commands, the EDA system (204) then performs soft cluster placement. During the soft cluster placement, the EDA system (204) attempts to pull cells in a cluster that are not encompassed by the corresponding physical region into, or as close as possible to, that physical region without adversely affecting QoR (quality of results) metrics (e.g., wire length, area, timing, power consumption). Because the power domains are defined as soft clusters, the EDA system (204) may also move critical cells, i.e., cells that adversely affect QoR and/or timing/congestion, out of the assigned physical regions as needed.

After the soft cluster placement, the APD tool (206) then refines the locations and shapes of the physical regions as needed based on the current placement of the cells in the corresponding power domains. Note that all cells in a power domain will not necessarily be in the assigned physical region after the soft cluster placement. The APD tool (206) may query the EDA database (208) to determine the current locations of cells in each power domain. This refinement, as with the determination of the physical regions, is based on the location and shape of the maximum concentration of cells in the power domains. Refinement of the physical regions is described in more detail below in reference to FIG. 3.

The APD tool (206) then redefines the cells included in the power domains as needed to include only those cells in a current power domain definition that lie within the assigned physical region and within a specified distance from the physical region, i.e., within the width of a "halo" around the physical region. Note that if all cells in a power domain are within the assigned physical region, there is no need to redefine the power domain. Redefining of the power domains is explained in more detail below in reference to FIG. 3.

In some embodiments of the invention, the APD tool (206) also enforces electrical cleanliness in the power domains. More specifically, only cells with isolation capability are allowed at the boundaries of the physical regions of power domains, and the APD tool (206) modifies the power domains as needed to enforce this criterion. In some embodiments of the invention, flops with isolation capabilities are included in the design and electrical cleanliness is enforced by requiring that only these flops are at the boundaries of each of the physical regions. Accordingly, if there are cells at the boundaries of a physical region that are not flops, the APD tool (206) removes these cells from the power domain and includes them in a top level power domain. In some embodiments of the invention, the APD tool (206) inserts isolation cells, which may or may not be flops, as needed at the boundaries of the physical regions instead of removing cells from the power domains. An isolation cell is a structure that provides power-up and power-down separation between different portions of a circuit.

The APD tool (206) then generates a sequence of commands to communicate the modified power domain definitions and the refined physical regions to the EDA system (204) and to cause the EDA system (204) to perform another placement of the design with the power domains and their corresponding physical regions defined as "hard" clusters to generate the final power domains. In some embodiments of the invention, one or more of the power domain/physical region pairs may be defined as inclusive hard clusters.

Responsive to the sequence of commands, the EDA system (204) then performs the hard cluster placement to generate the final power domains. During the hard cluster placement, the EDA system (204) pulls all cells in each cluster, i.e., all cells within the halo around the assigned physical region, into the assigned physical region. In some embodiments of the invention, the EDA system (204) performs incremental QoR optimization to pull the cells in a power domain into the corresponding physical region. The incremental QoR optimization fixes any minor degradations in timing, congestions, etc. of the design that may occur as the result of cell movement and ensures that the design is legally placed (on cell rows). After this placement, the EDA system (204) may be used to perform additional tasks, e.g., routing, to complete the design layout for fabrication.

Figure 3:
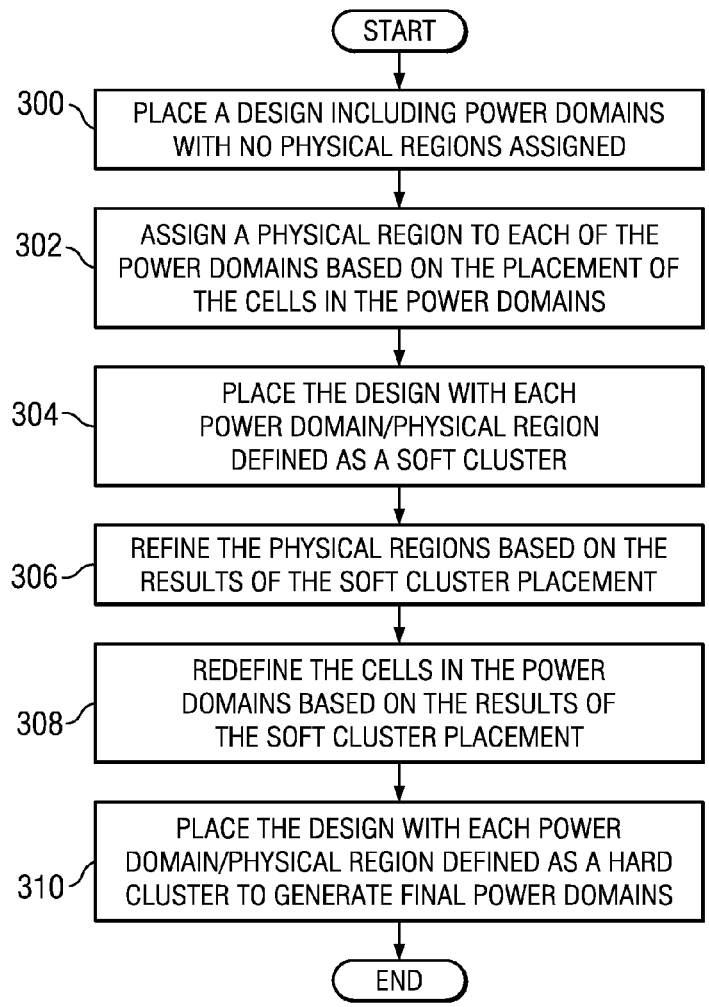
FIGS. 3-5B show flow diagrams of methods in accordance with one or more embodiments of the invention.

FIG. 3 shows a flow graph of a method for adaptive physical design in accordance with one or more embodiments of the invention. In some embodiments of the invention, the input to the method is a netlist of a system design along with the corresponding design constraints file, design exchange format file, and library exchange format file. The system design includes power domains in which cells included in the power domains are specified but no physical regions in the floorplan are assigned to the power domains. In some embodiments of the invention, the system design includes large numbers, e.g., hundreds, of fine-grained power domains grouped in one or more power domain hierarchies. The power domain definitions may be created in any suitable way, e.g., scripts processed by an EDA tool, manually by a designer using an EDA tool, or a combination thereof.

Figure 6A:
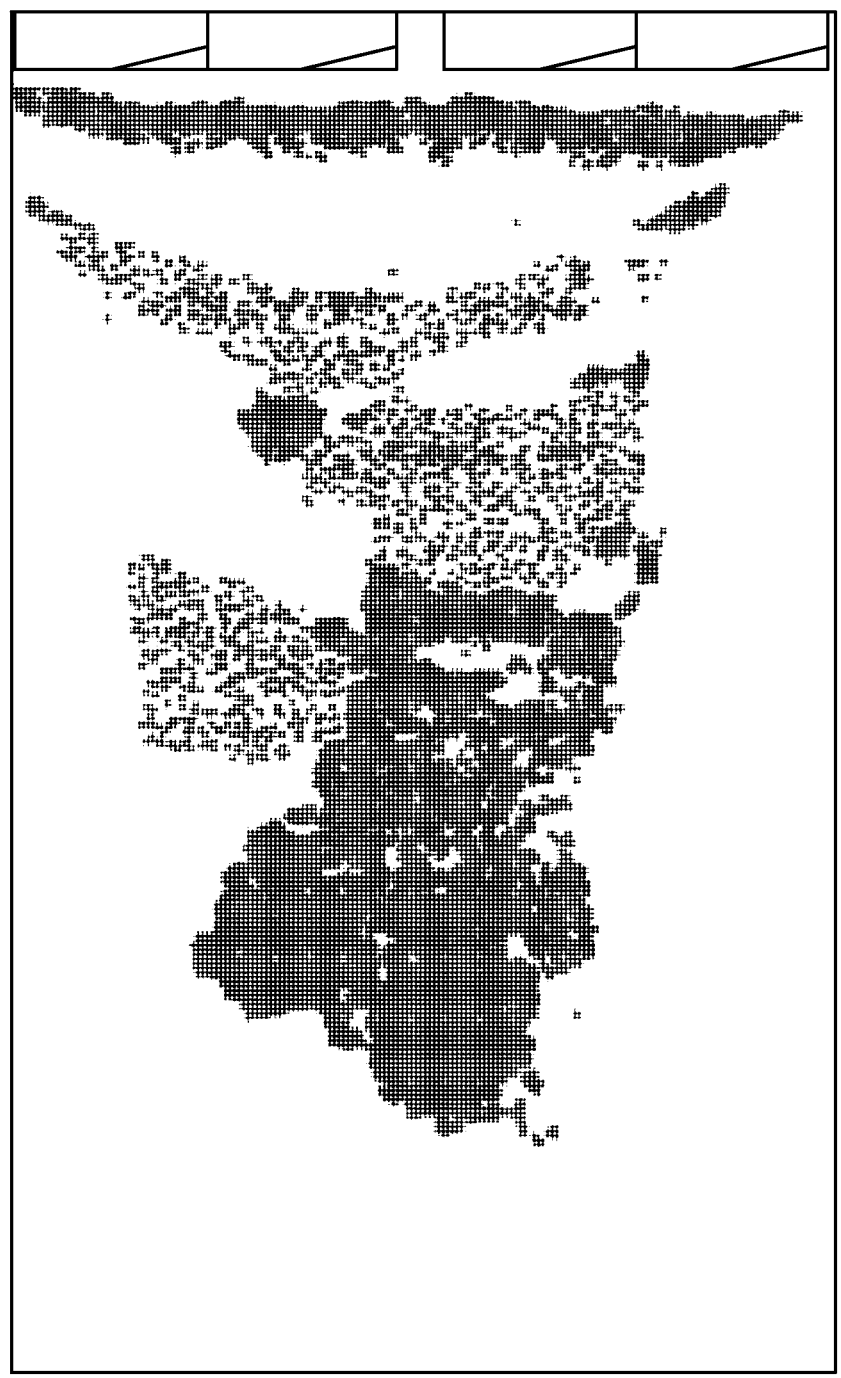
FIGS. 6A-6H show examples in accordance with one or more embodiments of the invention.

As shown in FIG. 3, initially, a placement of the system design is performed in which the cells in the power domains are freely placed, i.e., are not constrained to any particular area in the floorplan (300). FIG. 6A shows an example of the placement of cells in a single power domain after the free placement.

Following the free placement of the power domains, a physical region in the system floorplan is assigned to each of the power domains (302). A general guideline for the assignment of a physical region to a power domain is that the physical region is placed in the location where a maximum number of cells in that power domain were placed in free placement. Thus, a region in the system floorplan with a strong concentration of cells belonging to a particular power domain is the likely location for the physical region for that power domain.

Figure 4A:
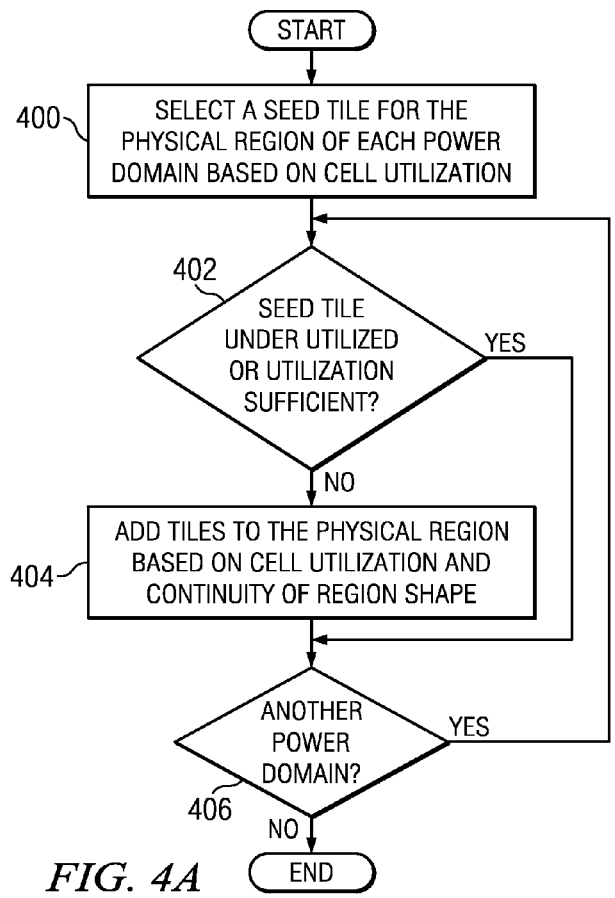
Figure 4B:
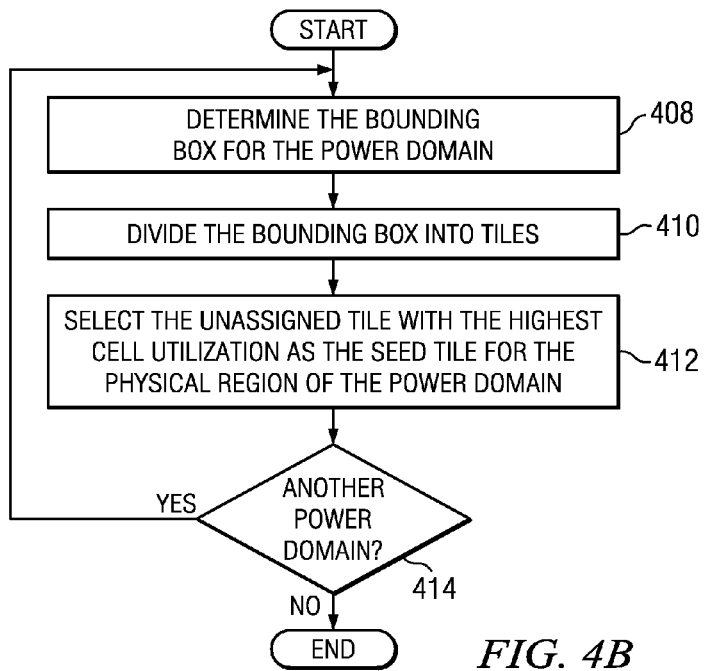
Figure 4C:
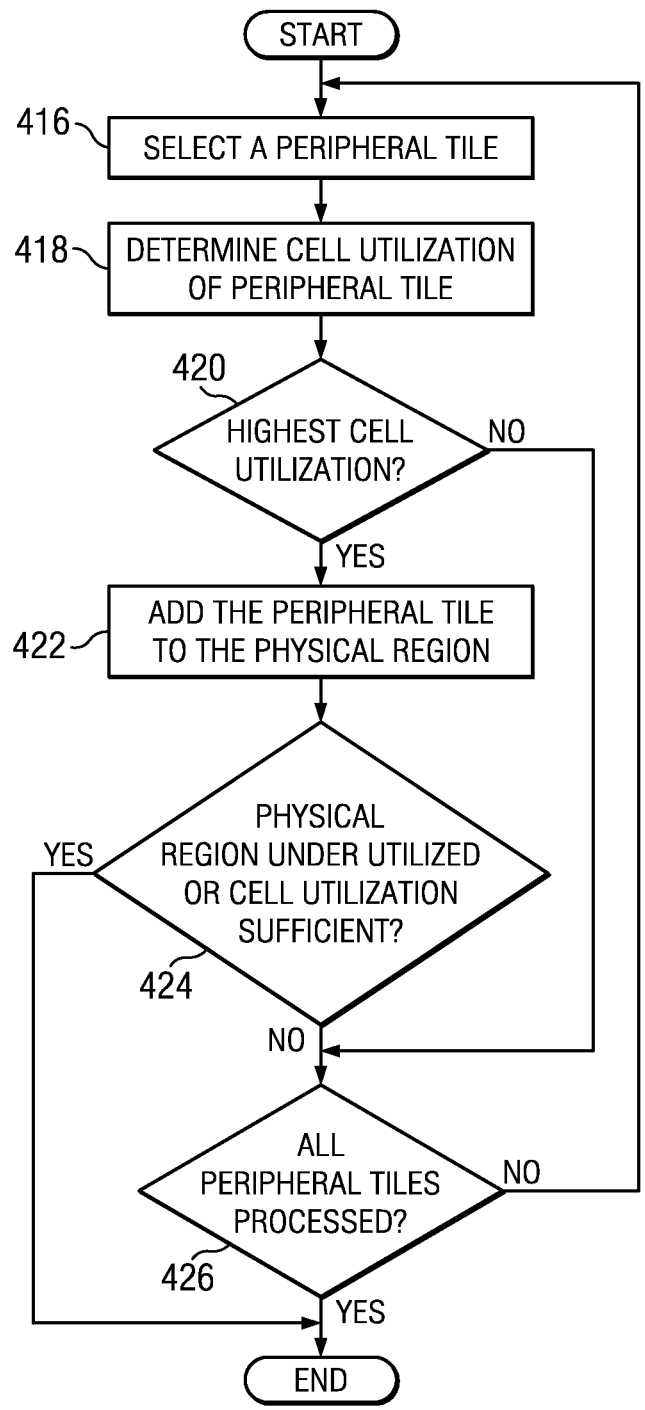

FIGS. 4A-4C show flow graphs of a method for assigning physical regions to power domains in accordance to one or more embodiments of the invention. Referring first to FIG. 4A, a seed tile is selected for the physical region of each power domain based on cell utilization (400). FIG. 4B shows a flow graph of a method for selecting the seed tiles. This method assumes that each power domain is processed individually to select the seed tile for the power domain. The power domains may be processed in any suitable order. In some embodiments of the invention, the power domains are processed in order of size, i.e., the total area of the cells in the power domain, with the largest power domain being processed first, and the smallest being processed last.

For each power domain (414), a bounding box is determined for the power domain (408). The bounding box is selected such that all cells in the power domain are encompassed in the bounding box. The bounding box may be determined by finding the minimum and maximum x coordinates of cells in the power domain, and the minimum and maximum y coordinates.

The bounding box is then logically divided into rectangular tiles (410). The tiles may be any suitable dimensions. The dimensions of the tiles may be user-specified and/or may be provided by an implementation. In some embodiments of the invention, the tile size is 20 µm×20 µm. An unassigned tile in the bounding box with the best cell utilization as compared to other tiles in the bounding box is then selected as the seed tile for the physical region of the power domain (412). Cell utilization of a power domain in a tile is the percentage area of the tile occupied by the cells in the power domain compared to the total area occupied by all cells in the tile. The area occupied by the cells in a tile that are in a given power domain, i.e., the power domain area, is computed as the sum of the areas of each of these cells. Similarly, the total area occupied by all cells in the tile, i.e., the total cell area, is computed as the sum of the areas of each of the cells in the tile. Cell utilization of the power domain in the tile may then be computed as the power domain area divided by the total cell area. For example, consider a tile with one hundred cells. Cells from two power domains, PD1 and PD2 are located in the tile along with cells not included in any power domain. Twenty cells in the tile are in PD1, forty cells in the tile are in PD2, and the remaining forty cells are not in a power domain. The power domain area for PD1, A1, is the sum of the areas of the twenty cells, and the power domain area for PD2, A2, is the sum of the areas of the forty cells. The total cell area for the tile, At, is the sum of A1, A2, and the areas of the forty cells not in a power domain. Thus, the cell utilization for PD1 in the tile is A1/At, and the cell utilization for PD2 in the tile is A2/At.

Figure 6B:
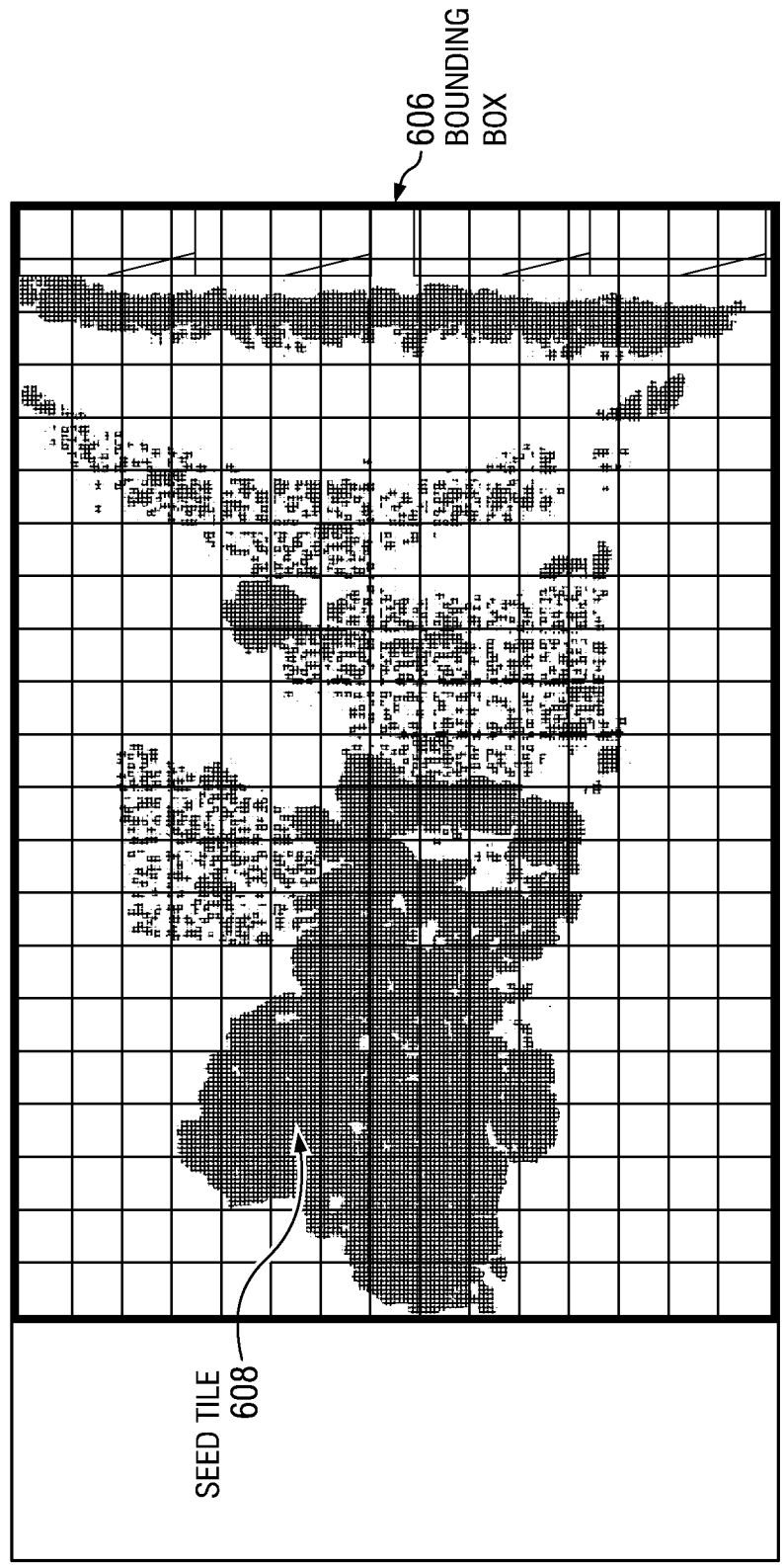

Cell utilization for the power domain is calculated for each tile in the bounding box, and the tile with the highest cell utilization that is not already assigned as the seed tile for another power domain is selected as the seed tile for the physical region of the power domain. A tile in the current power domain may be assigned as the seed tile for the physical region of another power domain as the selection of seed tiles for power domains is performed individually for each power domain and the bounding boxes of power domains may overlap. For example, consider a power domain, PD1, with a bounding box that encompasses four tiles, T1, T2, T3, and T4. The cell utilization of PD1 in these tiles is 35%, 55%, 50%, and 10%, respectively. T2 clearly has the highest cell utilization, so T2 would be selected as the seed tile for PD1 if T2 has not already been selected as the seed tile for the physical region of another power domain. If T2 is assigned to another power domain, then the tile with next highest utilization, T3, is selected as the seed tile unless T3 is also assigned to another power domain. If T3 is also assigned to another power domain, then the tile with the next highest utilization is considered, etc. If two or more tiles have the same highest cell utilization, then any one of the tiles may be selected as the seed tile according to any suitable criteria. In some embodiments of the invention, this selection is random. If all tiles in the bounding box are assigned to other power domains, then other suitable processing may be performed to select a seed tile. In some embodiments of the invention, the size of the bounding box is incrementally increased, e.g., by one tile in each direction, and the selection process repeated until a seed tile is selected. FIG. 6B shows an example of a bounding box (606) for the power domain of FIG. 6A and the seed tile (608) selected for determining the physical region to be assigned to the power domain.

Referring again to FIG. 4A, once a seed tile is selected for each power domain, a shape is determine for each physical region based on the corresponding seed tile (402-406). Each power domain is processed individually to determine the shape of the physical region for that power domain. The power domains may be processed in any suitable order. In some embodiments of the invention, the power domains are processed in order of size, i.e., the total area of the cells in the power domain, with the largest power domain being processed first, and the smallest being processed last. At this point, each physical region includes only the selected seed tile.

For each power domain (406), i.e., the current power domain, a determination is made as to whether the corresponding seed tile is under-utilized, sufficiently utilized, or over-utilized by the power domain as compared to the design utilization (402). Design utilization may be computed as the sum of the areas of the cells in the floorplan divided by the area of the floorplan. More specifically, the cell utilization of the current power domain in the seed tile is compared to a utilization range centered on the design utilization. The upper end of the utilization range, i.e., the maximum utilization, is the design utilization plus a delta, and the lower end of the utilization range, i.e., the minimum utilization, is the design utilization less the delta. The delta may have any suitable value, e.g., 5%. In some embodiments of the invention, the value of the delta is empirically determined. In one or more embodiments of the invention, the value of the delta may be specified by a user and/or may be provided by an implementation. If the cell utilization of the current power domain in the seed tile is within the utilization range, then the seed tile utilization is considered to be sufficient. If the cell utilization is below the minimum utilization, then the seed tile is considered to be under-utilized. If the cell utilization is above the maximum utilization, then the seed tile is considered to be over-utilized.

If the seed tile is under-utilized or the utilization is sufficient (402), then the shape of the physical region is not changed. That is, the physical region assigned to the power domain will be the region occupied by the seed tile. If the seed tile is over-utilized, then tiles are added to the physical region based on cell utilization and continuity of region shape (404). FIG. 4C shows a flow graph of a method for adding tiles to a physical region.

Figure 6C:
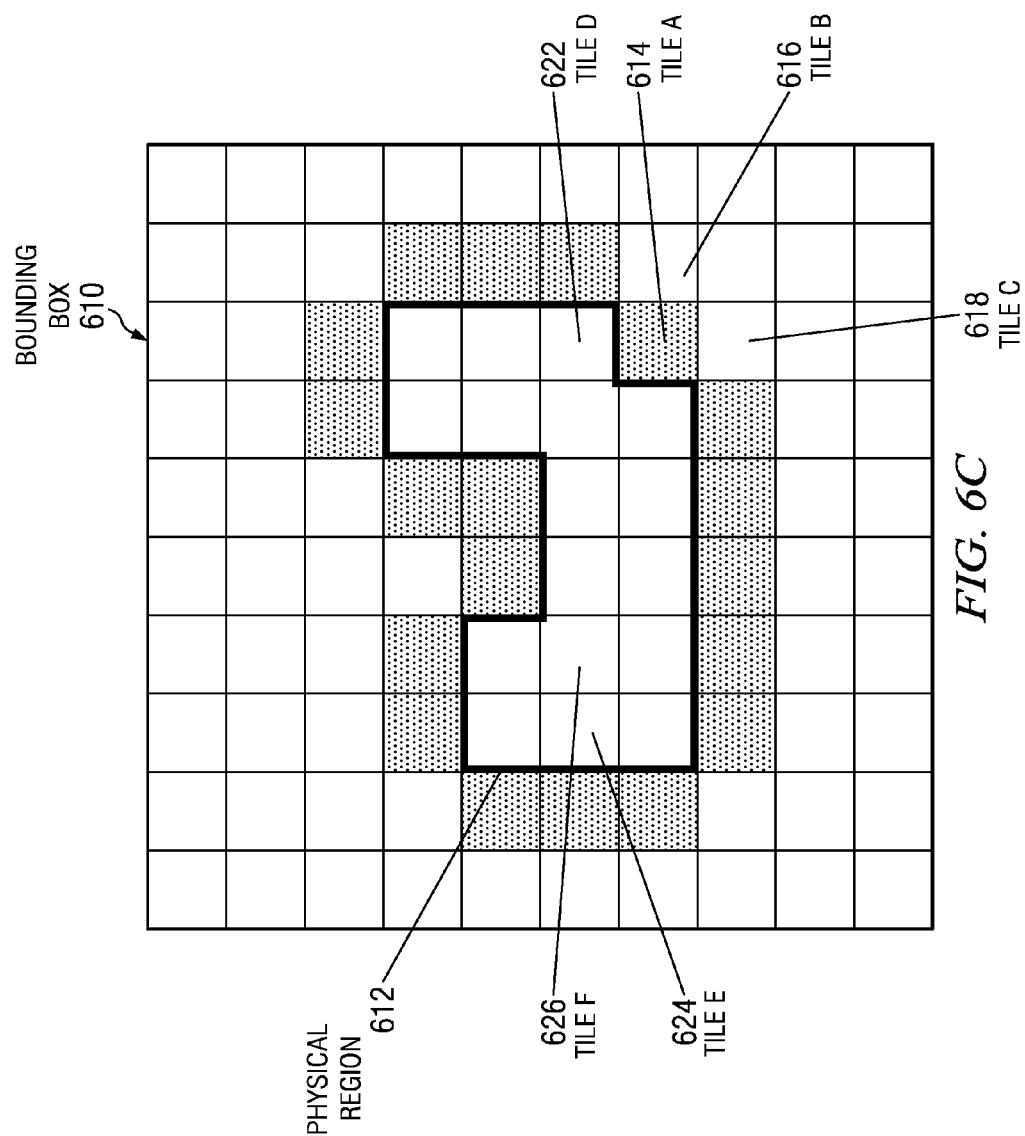

As shown in FIG. 4C, initially a peripheral tile of the physical region is selected for possible addition to the physical region (416). The shape of a physical region should be continuous, i.e., each tile in the physical region should be immediately adjacent to at least one side of another tile in the region. Accordingly, a peripheral tile of a physical region is a tile outside the physical region with at least one side immediately adjacent to the border of the physical region, i.e., that is immediately adjacent to one side of at least one outermost tile in the physical region. Consider the example shown in FIG. 6C. The peripheral tiles for the physical region (612) allocated in the bounding box (610) are the shaded tiles. If any one of the shaded tiles is added to the physical region (612), the shape of the physical region will remain continuous.

Referring again to FIG. 4C, initially the physical region includes only the seed tile, and thus has at most four peripheral tiles, the tile immediately to the left of the seed tile, the tile immediately to the right of the seed tile, the tile immediately above the seed tile, and the tile immediately below the seed tile. Note that depending on where the seed tile is located in the bounding box of the current power domain, one or more of the peripheral tiles may not exist. A peripheral tile is selected for possible addition to the physical region if that peripheral tile is not assigned to the physical region of another power domain. The peripheral tiles may be processed in any suitable order. In some embodiments of the invention, the peripheral tiles are ranked according to cell utilization of the power domain in the tiles, and are process in order of cell utilization, with the peripheral tile having the highest cell utilization processed first.

The cell utilization of each power domain with cells in the selected peripheral tile is then determined (418). These cell utilizations are computed as previously described. If the cell utilization of the current power domain is highest of the computed cell utilizations (420), then the peripheral tile is added to the physical region (422). Otherwise, another peripheral tile, if any (426), is selected (416). Adding a tile to the physical region changes the shape of the region and thus may add new peripheral tiles. Referring to the example of FIG. 6C, if tile A (614) is added to the physical region (612), then tile B (616) and tile C (618) become peripheral tiles of the modified physical region.

After the selected peripheral tile is added to the physical region, a determination is made as to whether the entire physical region is now under-utilized, sufficiently utilized, or over-utilized as compared to the utilization range (424). That is, the cell utilization of the current power domain across all of the tiles now included in the physical region is computed and compared to the utilization range. This cell utilization is computed as the sum of the areas of all the current power domain cells in the physical region divided by the sum of the areas of all cells in the physical region. If the physical region is now under-utilized or the design utilization is sufficient (424), the method ends. Otherwise, the physical region is over-utilized, and another peripheral tile, if any (426), is selected (416) for possible addition to the physical region.

Figure 5A:
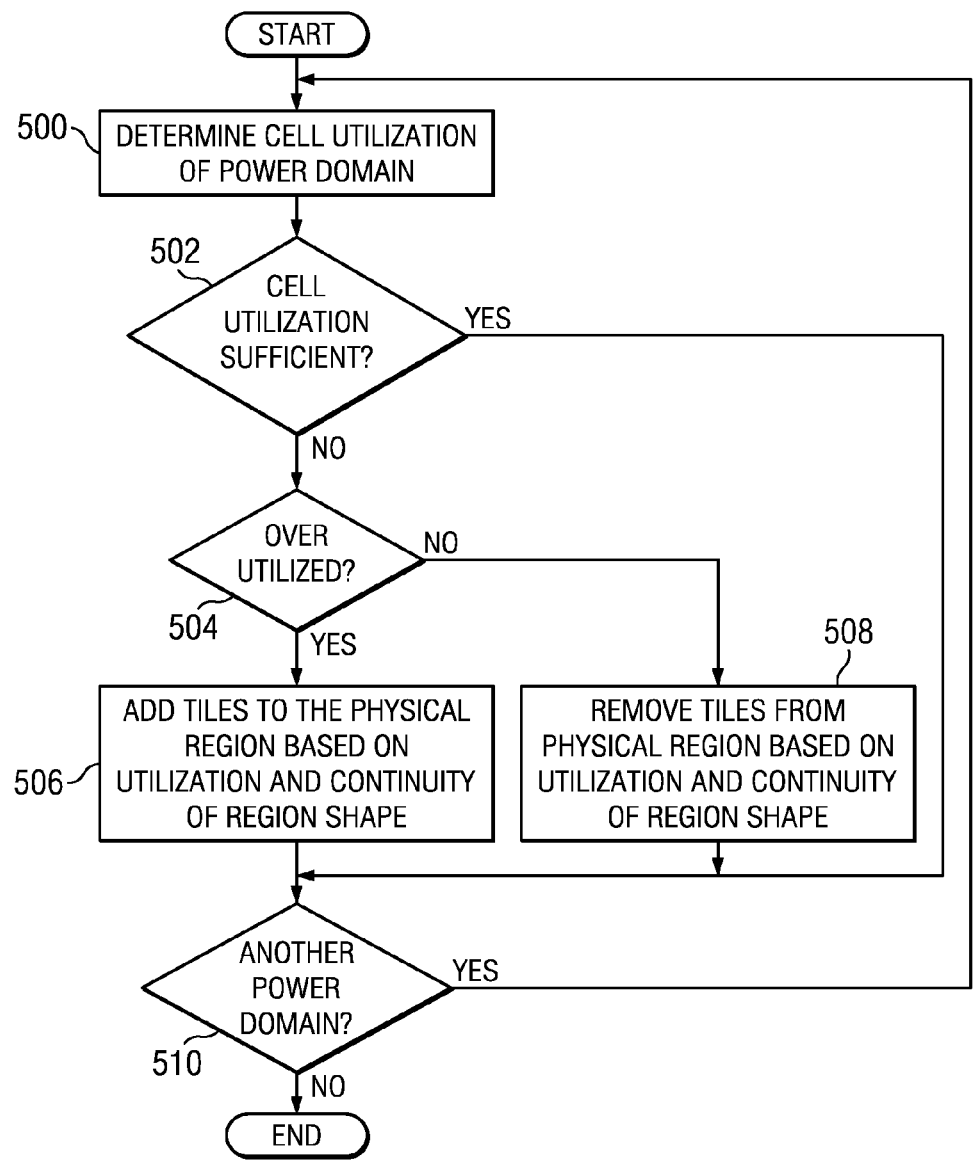
Figure 6D:
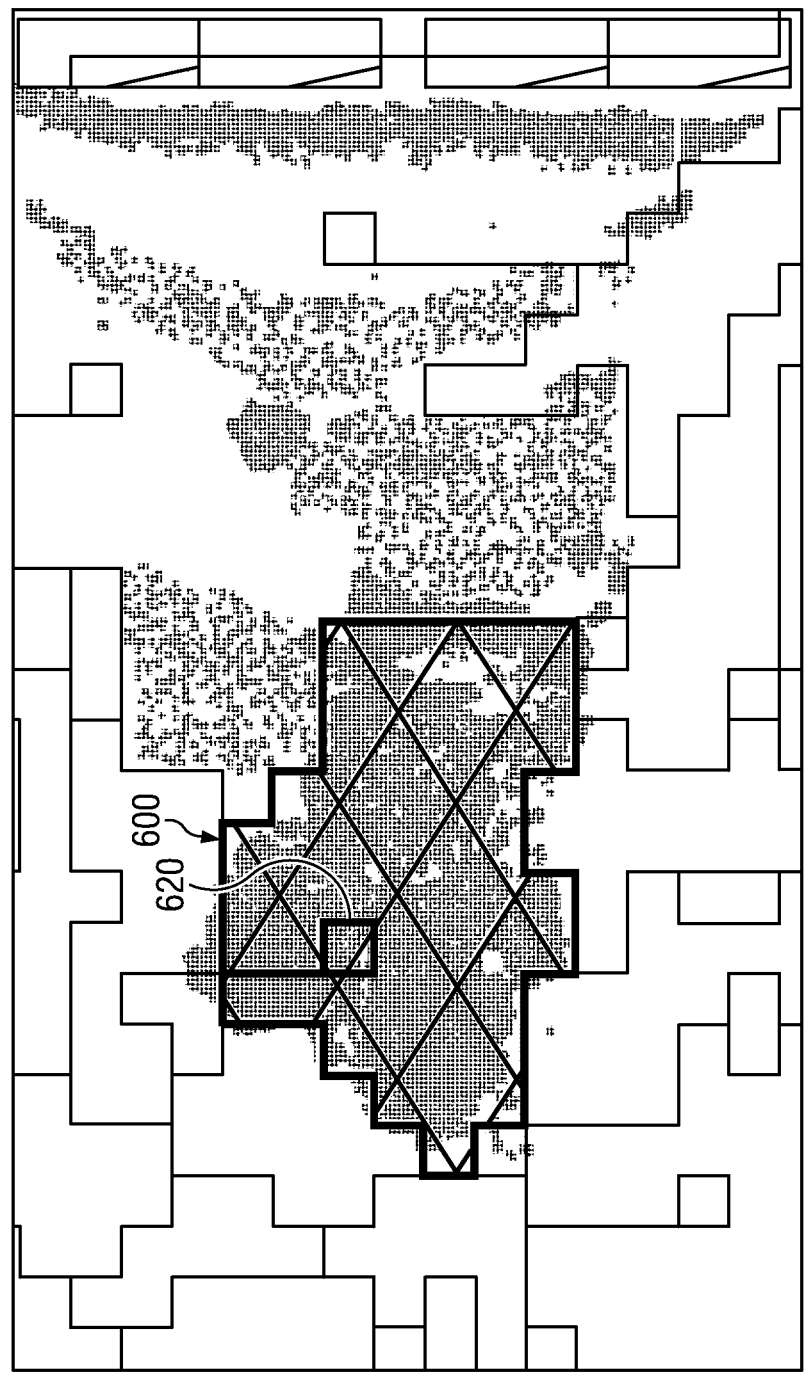

Referring again to FIG. 4A, after tiles are possibly added to the physical region for the current power domain (404), the method continues with the next power domain (406), if any. Note that after a single pass through the method of FIG. 4A, some of the resulting physical regions may be over or under utilized. Accordingly, the method of FIG. 5A may be performed to further refine the physical regions. As is explained below, the method of FIG. 5A may add or remove tiles from a physical region based on cell utilization. Further, the method of FIG. 5A may be repeated until the shapes of the physical regions stabilize, i.e., until no changes are made to any of the physical regions during an iteration. FIG. 6D shows an example of the seed tile (620) and the physical region (600) assigned for the power domain of FIG. 6A using the method of FIGS. 4A-4C.

Figure 6E:
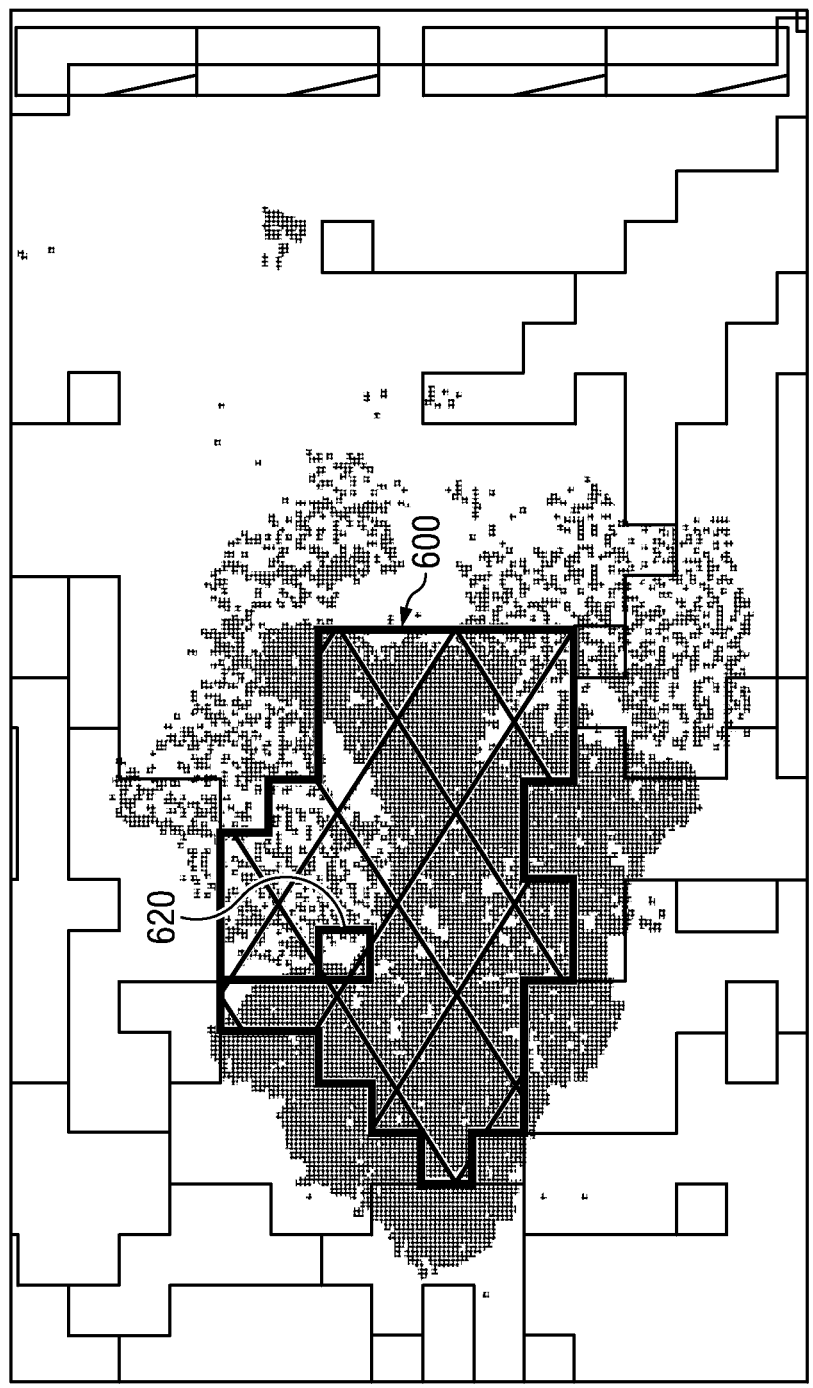

Referring again to FIG. 3, once a physical region is assigned for each power domain, another placement of the system design is performed with the power domains and their assigned physical regions defined as soft clusters (304). More specifically, for each power domain, the cells in that power domain are defined as a soft cluster for the purpose of placement and the corresponding physical region is set as the region in system floor plan in which the cluster is to be placed. The designation of a power domain as a soft cluster specifies that during placement, cells in the cluster are to be moved into the corresponding physical region if possible as long as QoR is satisfactory. That is, the placement process may move cluster cells out of the physical region to improve QoR. FIG. 6E shows an example of the soft cluster placement of the power domain of FIG. 6A with the physical region (600) of FIG. 6D.

Figure 5B:
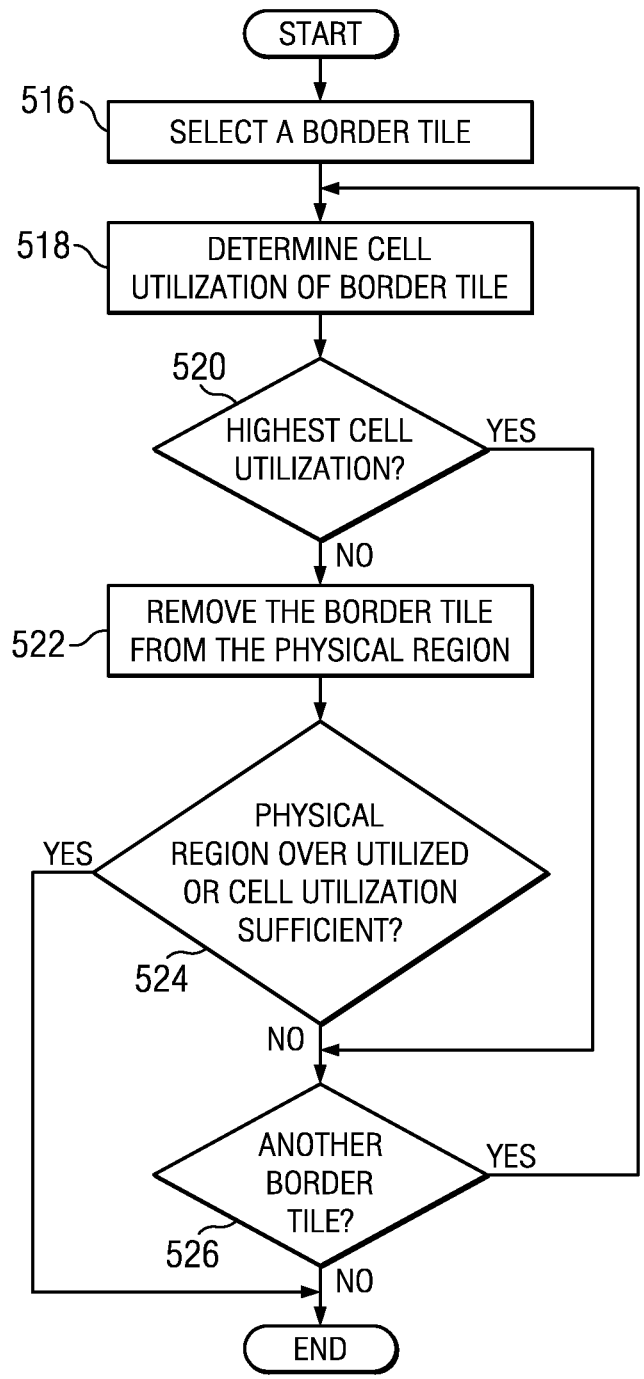

After the soft cluster placement, the physical regions for each power domain are refined based on the placement results (306). Each power domain is process individually to refine the shape of the assigned physical region. The power domains may be processed in any suitable order. In some embodiments of the invention, the power domains are processed in order of size, i.e., the total area of the cells in the power domain, with the largest power domain being processed first, and the smallest being processed last. FIGS. 5A and 5B show flow graphs of a method for refining the physical regions in accordance with one or more embodiments of the invention.

Referring first to FIG. 5A, for each power domain (510), i.e., the current power domain, the cell utilization of the current power domain in the assigned physical region is determined (500) as previously described. The power domain cell utilization is then compared to the utilization range. If the power domain cell utilization in the physical region is sufficient (502), then the physical region is not changed, and processing continues with the next power domain, if any (510). If the power domain cell utilization shows that the physical region is over-utilized (504), then tiles are added to the physical region based on utilization and continuity of region shape (506). A method for adding tiles to a physical region is described above in reference to FIG. 4C. Otherwise, the power domain utilization shows that the physical region is under-utilized as compared to the utilization range, and tiles are removed from the physical region based on utilization and continuity of region shape. A method for removing tiles is described below in reference to FIG. 5B. After the physical region shape is refined, processing continues with the next power domain, if any (510). Note that after a single pass through the method of FIG. 5A, some of the resulting physical regions may be over or under utilized. Accordingly, the method of FIG. 5A may be repeated until the shapes of the physical regions stabilize, i.e., until no changes are made to any of the physical regions during an iteration.

FIG. 5B shows a method for removing tiles from a physical region in accordance with one or more embodiments of the invention. As was previously mentioned, the shape of a physical region should be continuous. Accordingly, only border tiles are considered for removal from a physical region. A border tile of a physical region is a tile in the physical region with at least one side forming part of the border of the physical region. Consider the example of FIG. 6C. Tile D (622) and tile E (624) are border tiles of the physical region (612).

Initially, a border tile is selected for possible removal from the physical region (516). The border tiles may be processed in any suitable order. In some embodiments of the invention, the border tiles are ranked according to cell utilization of the power domain in the tiles, and are processed in order of cell utilization, with the border tile having the lowest cell utilization processed first. A border tile may be selected for consideration unless the removal of the border tile would cause incontinuity in the physical region, i.e., would make the region disjoint.

The cell utilization of each power domain having cells in the selected border tile is then determined (518). These cell utilizations are computed as previously described. If the cell utilization of the current power domain is not the highest of the computed cell utilizations (420), then the border tile is removed from the physical region (522). Otherwise, another border tile, if any (526), is selected (516). Removing a tile from the physical region changes the shape of the region and thus may add new border tiles. Referring to the example of FIG. 6C, if tile E (624) is removed from the physical region (612), then tile F (626) becomes a border tile of the modified physical region.

Figure 6F:
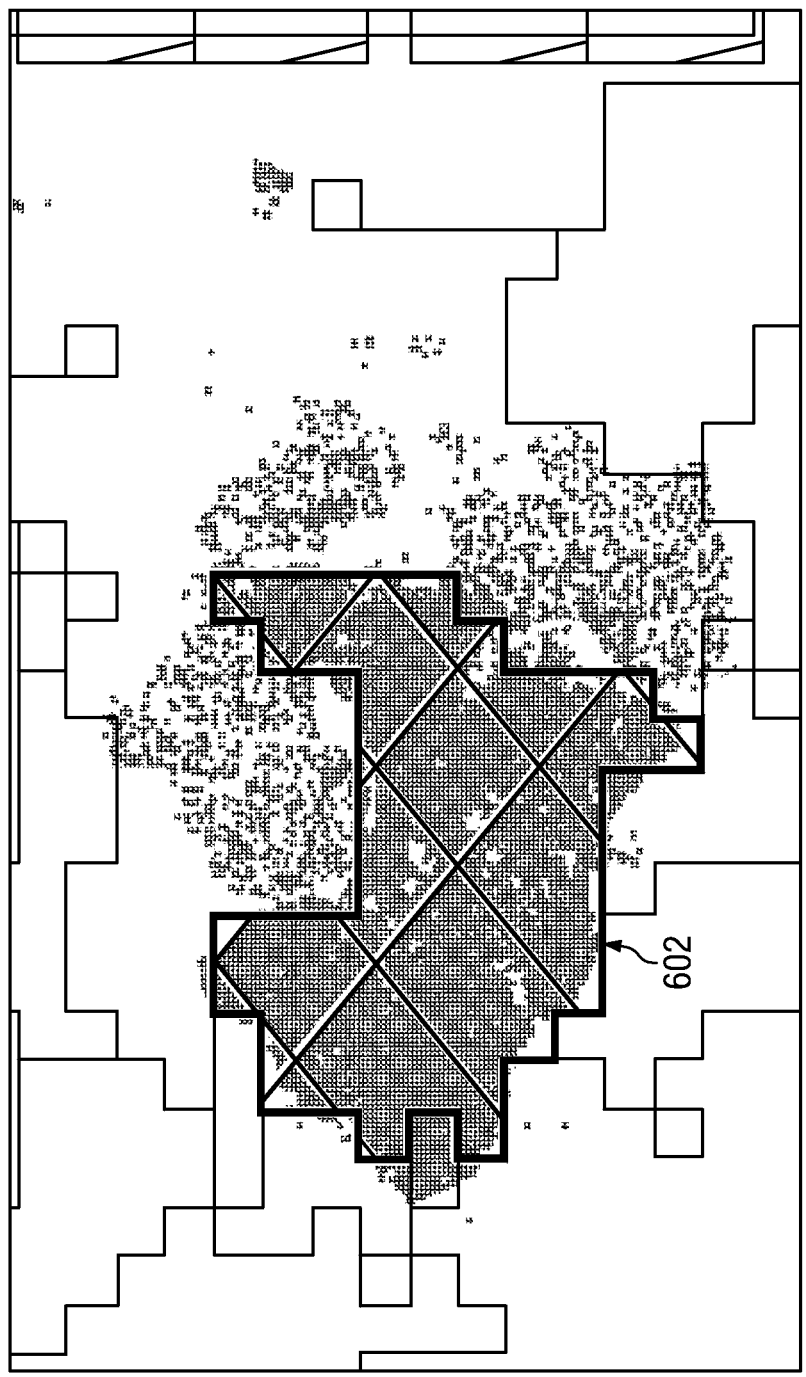

After the selected border tile is removed from the physical region, a determination is made as to whether the entire physical region is now under-utilized, sufficiently utilized, or over-utilized as compared to the utilization range (524). That is, the cell utilization of the current power domain across all of the tiles now included in the physical region is computed and compared to the utilization range. If the physical region is now over-utilized or the design utilization is sufficient (524), the method ends. Otherwise, the physical region is under-utilized, and another border tile, if any (526), is selected (516) for possible removal from the physical region. FIG. 6F shows an example of the refined physical region (602) for the power domain of FIG. 6A after application of the methods of FIGS. 5A and 5B.

Figure 6G:
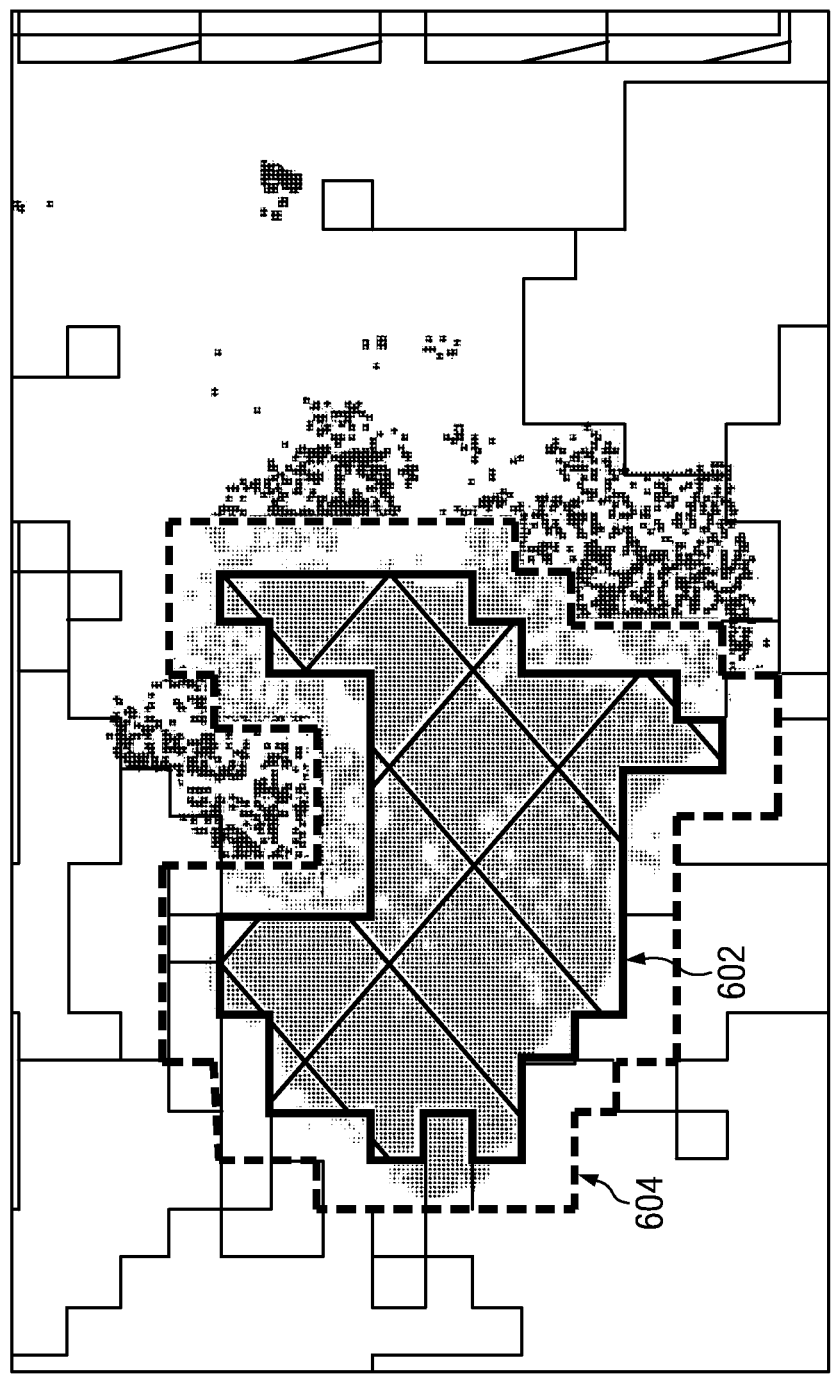

Referring again to FIG. 3, after the physical regions are refined, the cells included in the power domains may be redefined based on the refined physical regions (308). As can be seen in the example of FIG. 6F, after the soft cell placement and the refinement of the physical regions, there may be a number of cells in one or more of the power domains that are too far from the corresponding physical regions to be placed in the physical regions without adversely affecting timing, area, and/or wire length. Accordingly, one or more of the power domains may be redefined to include only those cells that appear to be suitable candidates for placement in the physical regions. Each power domain is redefined as needed to include the power domain cells that are currently placed in the corresponding physical region and those power domain cells that are within a specified distance of the physical region, i.e., within a "halo" of a certain width around the physical region. Any power domain cells not within the halo/physical region are removed from the definition of the power domain. The distance/width may be empirically determined. The distance/width may be user-specified and/or may be provided by an implementation. In some embodiments of the invention, the width of the halo is one tile. FIG. 6G shows an example of a halo (604) with a width of one tile around the refined physical region (602) of the power domain of FIG. 6A. In some embodiments of the invention, the power domains are also modified as needed to enforce electrical cleanliness.

Figure 6H:
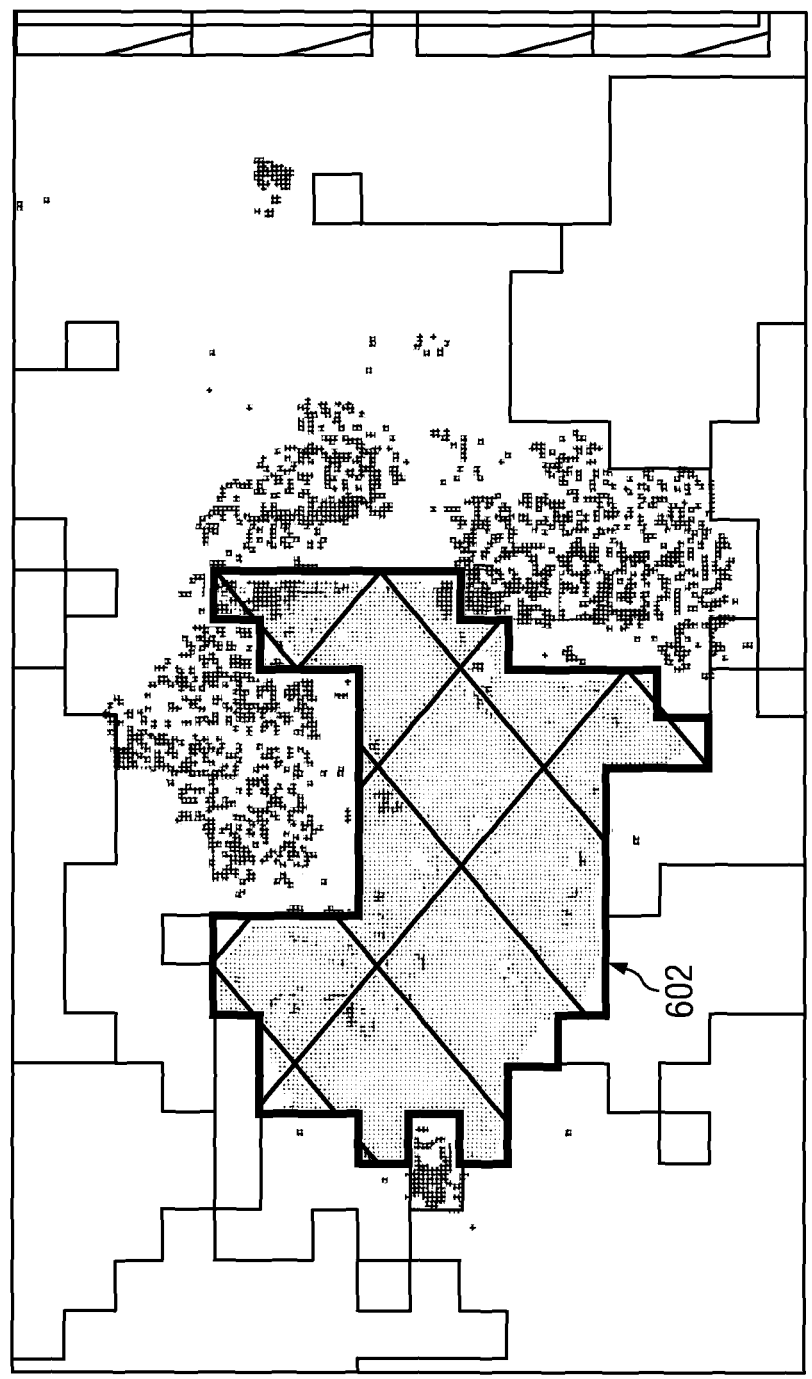

Referring again to FIG. 3, after the power domains are redefined as needed (308), another placement of the system design is performed with the power domains defined as hard clusters to generate the final power domains (310). More specifically, for each power domain, the cells in that power domain are defined as a hard cluster for the purpose of placement and the corresponding physical region is set as the region in the system floor plan in which the cluster is to be placed. The designation of a power domain as a hard cluster specifies that during placement, cells in the cluster are required to be moved into the corresponding physical region. During this placement, incremental optimization is performed to pull the power domain cells in the haloes into the physical regions. The power domain cells in the physical regions after this placement are the final power domains. FIG. 6H shows an example of the hard cluster placement of the redefined power domain of FIG. 6G in the physical region (602). After the hard cluster placement, additional processing may be performed, e.g., routing, to complete the design layout for fabrication.

Figure 7:
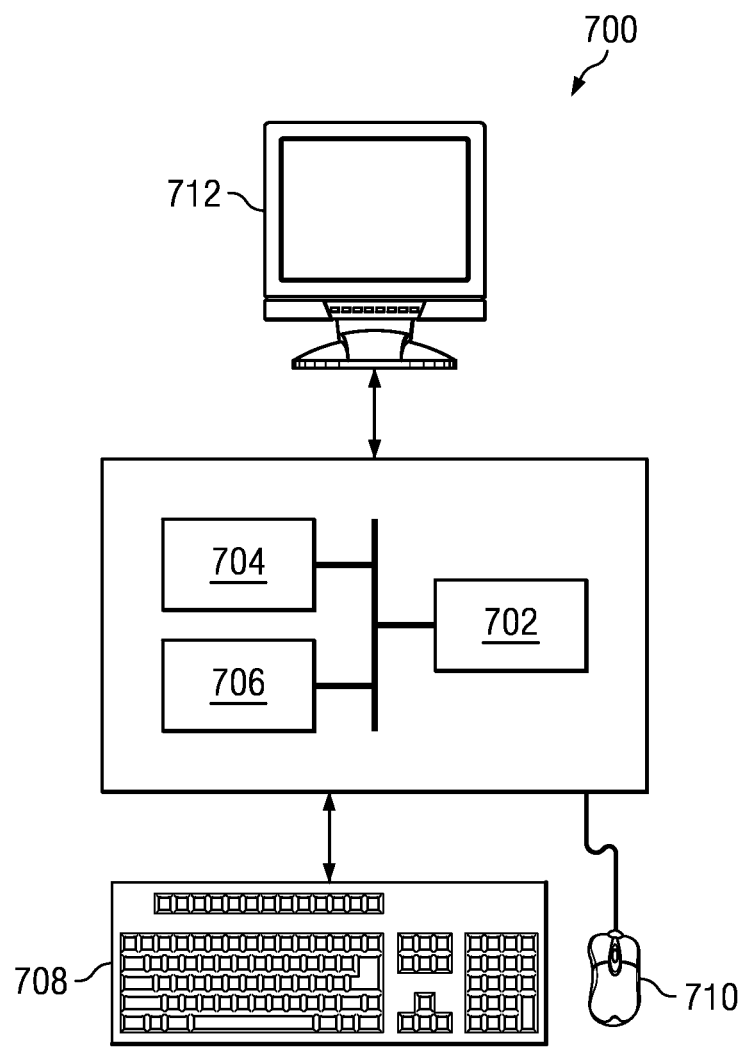
FIG. 7 shows an illustrative computer system in accordance with one or more embodiments of the invention.

FIG. 7 shows a simplified block diagram of an illustrative computer system (700) that can be used to execute software incorporating embodiments of the invention. The computer system (700 includes a processor (702), associated memory (704), a storage subsystem (706), and numerous other elements and functionalities typical of computer systems (not shown). In one or more embodiments of the invention, the computer system (700) may include multiple processors and some or all of the associated memory (704) may be shared by the multiple processors. The computer system (700) may also include input means, such as a keyboard (708) (or other input device) and a mouse (710) (or other cursor control device), and output means, such as a monitor (712) (or other display device). The computer system (700) may be connected to a network (not shown) (e.g., a local area network (LAN), a wide area network (WAN) such as the Internet, a cellular network, any other similar type of network and/or any combination thereof) via a network interface connection (not shown). Those skilled in the art will appreciate that the input and output means may take other forms. Further, those skilled in the art will appreciate that one or more elements of the computer system (700) may be located at a remote location and connected to the other elements over a network.

The storage subsystem (706) provides storage for program and data files, and may include one or more storage devices such as, for example, a hard disk drive, a floppy disk drive, a CD/DVD drive, and/or an optical drive. Executable software configured to perform embodiments of the invention when executed by the processor (702) may be stored in the storage subsystem (706) along with some or all of the required data.

Software instructions, scripts, files, etc. to perform embodiments of the invention may be stored on a computer readable medium such as a compact disc (CD), a diskette, a tape, a file, memory, or any other computer readable storage device or any combination thereof. The software instructions, scripts, files, etc. may be distributed to the computer system (700) via removable computer readable media (e.g., floppy disk, optical disk, flash memory, USB key), via a transmission path from a computer readable medium on another server, network-attached storage device, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method of designing an integrated circuit in a computer implemented design system, the method comprising:
performing a free physical placement of a system design comprising a plurality of power domains, wherein the power domains are not constrained to physical regions;
assigning a physical region to each of the power domains based on the free placement of cells in the power domains;
performing a soft cluster placement of the system design with each power domain and corresponding physical region defined as a soft cluster;
refining at least one physical region based on the soft cluster placement;
redefining cells in at least one power domain based on the soft cluster placement of the cells and the corresponding physical region; and
performing a hard cluster placement of the system design with each power domain and corresponding physical region defined as a hard cluster to generate final power domains,
wherein the performing a free placement, the assigning a physical region, the performing a soft cluster placement, the refining at least one physical power domain, and the performing a hard cluster placement are performed on the computer implemented design system.

2. The method of claim 1, wherein assigning a physical region comprises:
selecting a seed tile for the physical region of a power domain based on cell utilization; and adding a peripheral tile to the physical region when the seed tile is over-utilized, wherein the peripheral tile is selected based on cell utilization in the peripheral tile of the power domain and continuity of the physical region.

3. The method of claim 2, wherein selecting a seed tile comprises:
determining a bounding box for the power domain;
dividing the bounding box into tiles; and
selecting a tile in the bounding box with a highest cell utilization of the power domain as the seed tile.

4. The method of claim 1, wherein refining at least one physical region comprises:
adding at least one peripheral tile to the at least one physical region when a cell utilization in the at least one physical region of a corresponding power domain exceeds a utilization range, wherein the at least one peripheral tile is selected based on cell utilization in the peripheral tile of the corresponding power domain and continuity of the at least one physical region.

5. The method of claim 1, wherein refining at least one physical region comprises:
removing at least one border tile from the at least one physical region when a cell utilization in the at least one physical region of a corresponding power domain is below a utilization range, wherein the at least one border tile is selected based on cell utilization in the border tile of the corresponding power domain and continuity of the at least one physical region.

6. The method of claim 1, wherein redefining at least one power domain comprises:
removing a cell from the at least one power domain when the cell is not placed in a region defined by a halo around the physical region corresponding to the at least one power domain.

7. The method of claim 6, wherein a width of the halo is one tile.

8. A design system comprising:
means for performing a free physical placement of a system design comprising a plurality of power domains, wherein the power domains are not constrained to physical regions;
means for assigning a physical region to each of the power domains based on the free placement of cells in the power domains;
means for performing a soft cluster placement of the system design with each power domain and corresponding physical region defined as a soft cluster;
means for refining at least one physical region based on the soft cluster placement;
means for redefining cells in at least one power domain based on the soft cluster placement of the cells and the corresponding physical region; and
means for performing a hard cluster placement of the system design with each power domain and corresponding physical region defined as a hard cluster to generate final power domains.

9. The design system of claim 8, wherein the means for assigning a physical region comprises:
means for selecting a seed tile for the physical region of a power domain based on cell utilization; and
means for adding a peripheral tile to the physical region when the seed tile is over-utilized, wherein the peripheral tile is selected based on cell utilization in the peripheral tile of the corresponding power domain and continuity of the physical region.

10. The design system of claim 9, wherein the means for selecting a seed tile comprises:
means for determining a bounding box for the power domain;
means for dividing the bounding box into tiles; and
means for selecting a tile in the bounding box with a highest cell utilization of the power domain as the seed tile.

11. The design system of claim 8, wherein the means for refining at least one physical region comprises:
means for adding at least one peripheral tile to the at least one physical region when a cell utilization in the at least one physical region of a corresponding power domain exceeds a utilization range, wherein the at least one peripheral tile is selected based on cell utilization in the peripheral tile of the corresponding power domain and continuity of the at least one physical region.

12. The design system of claim 8, wherein the means for refining at least one physical region comprises:
means for removing at least one border tile from the at least one physical region when a cell utilization in the at least one physical region of a corresponding power domain is below a utilization range, wherein the at least one border tile is selected based on cell utilization in the border tile of the corresponding power domain and continuity of the at least one physical region.

13. The design system of claim 8, wherein the means for redefining at least one power domain comprises:
means for removing a cell from the at least one power domain when the cell is not placed in a region defined by a halo around the physical region corresponding to the at least one power domain.

14. The design system of claim 13, wherein a width of the halo is one tile.

15. A non-transitory computer readable medium storing instructions that, when executed by a processor of a computer system, cause the computer system to perform a method comprising:
performing a free physical placement of a system design comprising a plurality of power domains, wherein the power domains are not constrained to physical regions;
assigning a physical region to each of the power domains based on the free placement of cells in the power domains;
performing a soft cluster placement of the system design with each power domain and corresponding physical region defined as a soft cluster;
refining at least one physical region based on the soft cluster placement;
redefining cells in at least one power domain based on the soft cluster placement of the cells and the corresponding physical region; and
performing a hard cluster placement of the system design with each power domain and corresponding physical region defined as a hard cluster to generate final power domains.

16. The computer readable medium of claim 15, wherein assigning a physical region comprises:
selecting a seed tile for the physical region of a power domain based on cell utilization; and
adding a peripheral tile to the physical region when the seed tile is over-utilized, wherein the peripheral tile is selected based on cell utilization in the peripheral tile of the corresponding power domain and continuity of the physical region.

17. The computer readable medium of claim 16, wherein selecting a seed tile comprises:
determining a bounding box for the power domain;
dividing the bounding box into tiles; and selecting a tile in the bounding box with a highest cell utilization of the power domain as the seed tile.

18. The computer readable medium of claim 15, wherein refining at least one physical region comprises:
adding at least one peripheral tile to the at least one physical region when a cell utilization in the at least one physical region of a corresponding power domain exceeds a utilization range, wherein the at least one peripheral tile is selected based on cell utilization in the peripheral tile of the corresponding power domain and continuity of the at least one physical region.

19. The computer readable medium of claim 15, wherein refining at least one physical region comprises:
removing at least one border tile from the at least one physical region when a cell utilization in the at least one physical region of a corresponding power domain is below a utilization range, wherein the at least one border tile is selected based on cell utilization in the border tile of the corresponding power domain and continuity of the at least one physical region.

20. The computer readable medium of claim 15, wherein redefining at least one power domain comprises:
removing a cell from the at least one power domain when the cell is not placed in a region defined by a halo around the physical region corresponding to the at least one power domain.

* * * * *